(12) United States Patent
Grunnet-Jepsen et al.

(10) Patent No.: US 9,304,597 B2
(45) Date of Patent: Apr. 5, 2016

(54) GESTURE BASED HUMAN COMPUTER INTERACTION

(71) Applicant: INTEL CORPORATION, Santa Clara, CA (US)

(72) Inventors: Anders Grunnet-Jepsen, San Jose, CA (US); John N. Sweetser, San Jose, CA (US); Paul Winer, Santa Cruz, CA (US); Steven S. Bateman, Portland, OR (US); Akihiro Takagi, San Mateo, CA (US); Leonid M. Keselman, Santa Clara, CA (US); Chandrika Jayant, San Francsico, CA (US); Jonathan C. Thompson, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/127,106

(22) PCT Filed: Oct. 29, 2013

(86) PCT No.: PCT/US2013/067323
§ 371 (c)(1),
(2) Date: Dec. 17, 2013

(87) PCT Pub. No.: WO2015/065341
PCT Pub. Date: May 7, 2015

(65) Prior Publication Data
US 2015/0116214 A1 Apr. 30, 2015

(51) Int. Cl.
*G06F 3/01* (2006.01)
*G06F 3/0481* (2013.01)

(52) U.S. Cl.
CPC ............. *G06F 3/017* (2013.01); *G06F 3/0481* (2013.01)

(58) Field of Classification Search
CPC ... G06F 3/038; G06F 3/0338; G06F 3/03543; G06F 1/169; G06F 3/0362; G06F 3/04883; G06F 3/017; G06F 3/0481; G06F 3/0488; G06F 2203/4807

USPC ........... 345/156–158, 173–179, 419; 715/863
See application file for complete search history.

(56) References Cited

U.S. PATENT DOCUMENTS 8,515,128 B1 * 8/2013 Hildreth .................. G06F 3/017
345/156
2007/0149282 A1 * 6/2007 Lu et al. .......................... 463/36

(Continued)

FOREIGN PATENT DOCUMENTS

JP 2013-069272 A 4/2013
JP 2013-069273 A 4/2013
WO WO2013/071198 A2 * 5/2013

OTHER PUBLICATIONS

International Search Report and Written Opinion mailed Jul. 31, 2014 for International Application No. PCT/US2013/067323, 18 pages.

*Primary Examiner* — Md Saiful A Siddiqui
(74) *Attorney, Agent, or Firm* — Schwabe, Williamson & Wyatt, P.C.

(57) ABSTRACT

Apparatus, computer-readable storage medium, and method associated with human computer interaction. In embodiments, a computing device may include a plurality of sensors, including a plurality of light sources and a camera, to create a three dimensional (3-D) interaction region within which to track individual finger positions of a user of the computing device. The light sources and the camera may be complementarily disposed for the camera to capture the finger or hand positions. The computing device may further include a 3-D interaction module configured to analyze the individual finger positions within the 3-D interaction region, the individual finger movements captured by the camera, to detect a gesture based on a result of the analysis, and to execute a user control action corresponding to the gesture detected. Other embodiments may be described and/or claimed.

21 Claims, 5 Drawing Sheets

(56) References Cited

U.S. PATENT DOCUMENTS

| | | |
|---|---|---|
| 2008/0005703 A1* | 1/2008 | Radivojevic et al. ......... 715/863 |
| 2008/0007542 A1* | 1/2008 | Eliasson et al. ............... 345/176 |
| 2008/0036743 A1 | 2/2008 | Westerman et al. |
| 2008/0036943 A1* | 2/2008 | Matsumoto et al. ............ 349/68 |
| 2009/0079700 A1* | 3/2009 | Abernathy .................... 345/173 |
| 2010/0050133 A1* | 2/2010 | Nishihara et al. ............. 715/863 |
| 2011/0205151 A1* | 8/2011 | Newton et al. ................ 345/156 |
| 2012/0056804 A1 | 3/2012 | Radivojevic et al. |
| 2013/0169594 A1* | 7/2013 | Yi et al. ........................ 345/175 |
| 2013/0229348 A1 | 9/2013 | Lee |
| 2013/0326407 A1* | 12/2013 | van Os et al. ................. 715/810 |
| 2014/0201690 A1* | 7/2014 | Holz ............................. 715/863 |
| 2014/0298266 A1* | 10/2014 | Lapp ............................. 715/835 |
| 2014/0306897 A1* | 10/2014 | Cueto ........................... 345/173 |

\* cited by examiner

GESTURE BASED HUMAN COMPUTER INTERACTION

CROSS REFERENCE TO RELATED APPLICATIONS

The present application is a national phase entry under 35 U.S.C. §371 of International Application No. PCT/US2013/067323, filed Oct. 29, 2013, entitled "GESTURE BASED HUMAN COMPUTER INTERACTION", which designated, among the various States, the United States of America. The Specification of the PCT/US2013/067323 Application is hereby incorporated by reference.

TECHNICAL FIELD

Embodiments of the present disclosure are related to the field of human computer interaction, and in particular, to gesture based human computer interaction.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Human computer interactions have traditionally been relegated to user control via physical interaction of a user with one or more input devices, such as a mouse, a keyboard, a track ball, a touch pad, and so forth. The mouse, et al have essentially become the sine qua non of human computer interaction. While a user's interaction with a mouse et al may have become somewhat ingrained with users, the interaction has never been natural or intuitive.

DETAILED DESCRIPTION OF ILLUSTRATIVE EMBODIMENTS

A method, storage medium, and computing device for human computer interaction are described. In embodiments, the computing device may include a plurality of sensors, including a plurality of light sources and a camera, to create a three dimensional (3-D) interaction region within which to track individual finger positions of a user of the computing device, and thereby track finger movements. The light sources and the camera may be complementarily disposed for the camera to capture the finger or hand positions. An example of a 3D region may include a 3D region in front of a display screen. The computing device may also include a 3-D interaction module coupled with the plurality of sensors. The 3-D interaction module may be configured to analyze the individual fingers within the 3-D interaction region, captured by the camera, to detect a gesture based on a result of the analysis. Gestures may include e.g., holding an individual finger in a fixed location for a pre-determined period of time within the 3-D interaction region. On detection of the gesture the 3-D interaction module may execute a user control action corresponding to the gesture detected. For the example of holding of an individual finger, the user control action may be executed at the correlated location of the cursor rendered on the display screen. In embodiments, the display screen may be a floating display screen projected to coincide or intersect with the 3D interaction region.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
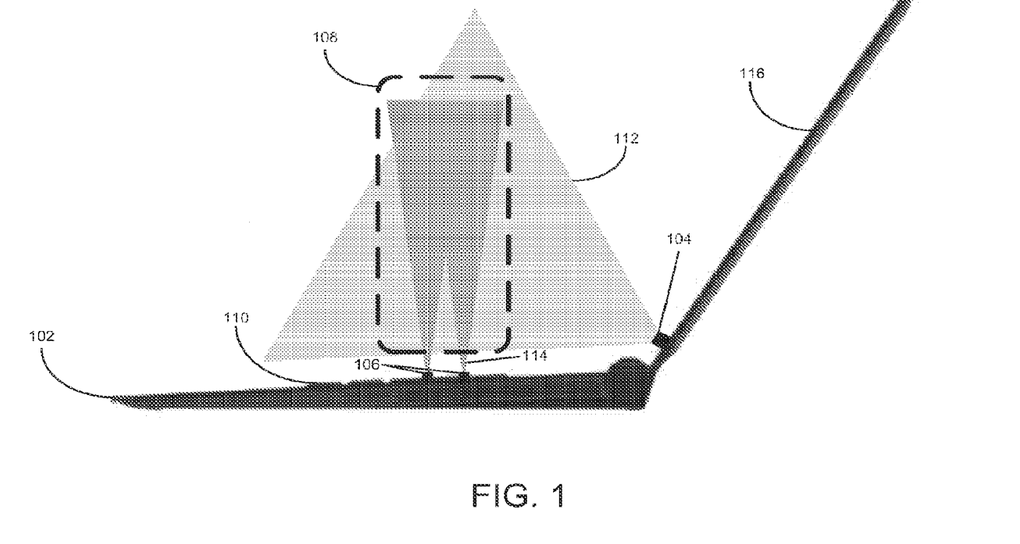
FIG. 1 depicts an illustrative environment in which some embodiments of the present disclosure may be practiced.

FIG. 1 depicts an illustrative computing environment 100 in which some embodiments of the present disclosure may be practiced. Computing environment 100 may include a computing device, such as portable computing device 102. Portable computing device 102 may include a number of sensors, such as camera 104 and one or more light emitting diodes (LEDs) 106, integrated therein. As depicted, camera 104 may be configured with a viewing angle 112 to capture images in the area above keyboard 110. In embodiments, the one or more LEDs 106 and the camera 104 may be complimentarily disposed such that the combination may enable the tracking of finger positions. For example, as depicted here, the one or more LEDs 106 may be configured within keyboard 110 such that light 114 emitted therefrom may project upward to intersect with viewing angle 112 of camera 104.

The intersection of the viewing angle 112 of camera 104 and the light 114 emitted by the one or more light emitting diodes 106 may create a three-dimensional (3-D) interaction region 108 within which a user may utilize one or more gestures to interact with computing device 102. This may be accomplished by tracking finger and/or hand positions, and thereby tracking finger and/or hand movements, of the user in the 3-D interaction region 108. The combination of camera 104 and the one or more light emitting diodes 106 may enable fast and accurate tracking of the user gestures within the 3-D interaction region. In embodiments, the light 114 emitted by the one or more light emitting diodes 106 may be configured to accentuate, or highlight, gestures occurring within the 3-D interaction region and therefore may make it easier for computing device 102 to interpret the gestures captured by camera 106. For example, where a gesture is based upon a user's finger movements, the tips of the fingers may be tracked quickly and precisely due to the accentuation of the finger tips by the light 114 emitted from the one or more light emitting diodes 106. The accentuation of the finger tips may be effected by light emitted by light emitting diodes 106, scattered by the finger tips within the interaction region 108, and detected by camera 104.

In embodiments, computing device 102 may be configured to correlate actions of the user, such as positions of the user's fingertips, with a corresponding location of a positional indicator, such as a cursor, on a display 116 of computing device 102. In such an embodiment, a user may be able to move a cursor rendered on display 116 to a desired location near a desired object on display 116 and perform a gesture which may cause computing device 102 to carry out a user control action on the object.

Figure 2:
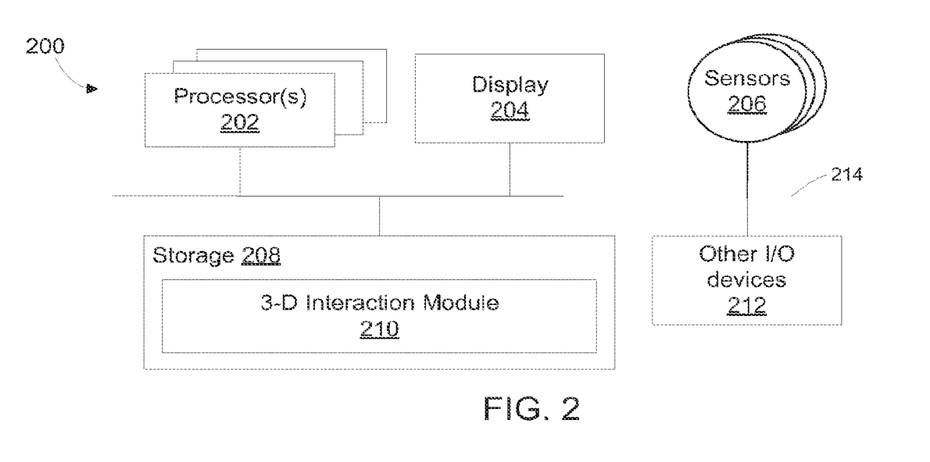
FIG. 2 depicts an illustrative configuration of a computing device according to some embodiments of the disclosure.

FIG. 2 depicts an illustrative configuration of a computing device 200 according to some embodiments of the disclosure. Computing device 200 may be any type of computing device including a portable computing device, such as a smart phone, tablet, ultrabook, ebook, laptop computer, or a stationary computing device, such as a desktop computer, kiosk computing device, or an automated teller machine (ATM). It will be appreciated that the computing devices mentioned above are merely examples that are meant to be illustrative. This disclosure is equally applicable regardless of the computing device's form.

Computing device 200 may comprise processor(s) 202, display 204, sensors 206, storage 208 containing 3-D interaction module 210, and other input/output (I/O) devices 212. Processor(s) 202, display 204, sensors 206, storage 208 and other input/output (I/O) devices 212 may all be coupled together utilizing system bus 214.

Processor(s) 202 may be comprised of a single processor or multiple processors. In multiple processor embodiments, the multiple processors may be of the same type, i.e. homogeneous, or may be of differing types, i.e. heterogeneous and may include any type of single or multi-core processors. This disclosure is equally applicable regardless of type and/or number of processors.

Figure 3:
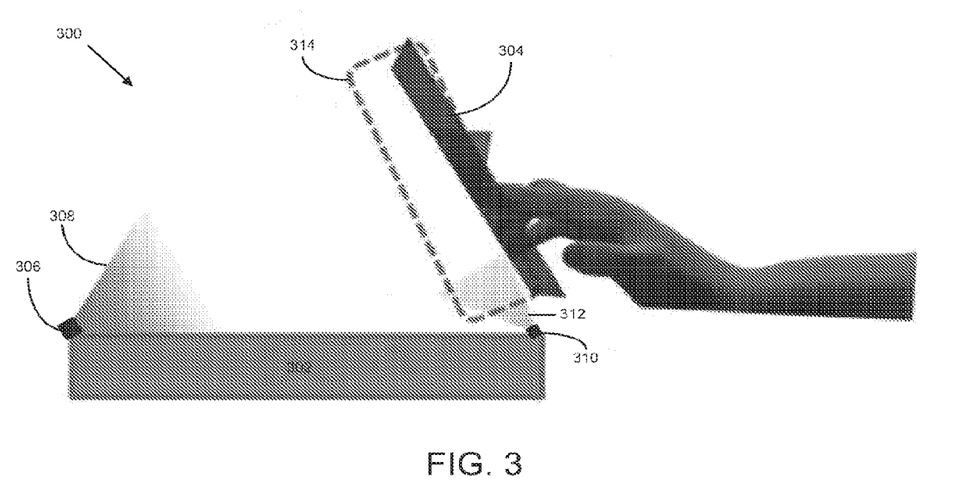
FIG. 3 depicts an illustrative environment including a three-dimensional (3-D) display in which some embodiments of the present disclosure may be practiced.

Display 204 may be any type of display including, but not limited to a cathode ray tube (CRT), a liquid crystal diode (LCD), an organic light emitting diode (OLED), or a 3-D display, such as that discussed in FIGS. 2 and 3. Display 204 may be incorporated into computing device 200 or may be peripherally connected to computing device 200 through any type of wired and/or wireless connection. This disclosure is equally applicable regardless of the type of display.

Sensors 206 may include, in some embodiments, sensors such as a camera configured to capture one or more images and one or more light emitting diodes. These sensors may configure computing device 200 with a 3-D interaction region within which a user of computing device 200 may interact with computing device 200. It will be appreciated that the sensors mentioned above are merely examples that are meant to be illustrative. Any 3-D sensors capable of capturing a user's gestures are contemplated.

In embodiments, storage 208 may be any type of computer-readable storage medium or any combination of differing types of computer-readable storage media. Storage 208 may include volatile and non-volatile/persistent storage. Volatile storage may include e.g., dynamic random access memory (DRAM). Non-volatile/persistent storage may include, but is not limited to, a solid state drive (SSD), a magnetic or optical disk hard drive, flash memory, or any multiple or combination thereof.

In embodiments 3-D interaction module 210 may be implemented as software, firmware, or any combination thereof. In some embodiments, 3-D interaction module 210 may comprise one or more instructions that, when executed by processor(s) 202, cause computing device 200 to perform one or more operations of any process described herein. In embodiments, 3-D interaction module 210 may be configured to receive data from sensors 206. In some embodiments, 3-D interaction module 210 may be configured to monitor a stream of data produced by sensors 206. In other embodiments, 3-D interaction module may be configured to periodically receive portions of data from sensors 206 for analysis.

In embodiments, 3-D interaction module 210 may be configured to analyze the data received from sensors 206. In some embodiments, the data may be analyzed to determine a location of a user's hand(s) and/or finger(s) within a 3-D interaction region created by the sensors. The 3-D interaction module 210 may be configured to correlate the determined location with a position of a cursor, or other positional indicator, rendered on display 204. In embodiments, this correlation may occur in real time such that the movements of a user are contemporaneously reflected by movement of the cursor rendered on display 204.

In some embodiments, the data may be analyzed to determine if a pre-determined gesture occurs within the sensor data, such as those gestures described in reference to FIGS. 5-8. This may be accomplished, for example, by determining coordinate movements within the data or comparing one or more images captured by one or more of the sensors with a database of images of gestures.

In embodiments, 3-D interaction module 210 may be configured to determine vital statistics of a user. This may be accomplished as discussed in reference to FIG. 4 below. In embodiments, the 3-D interaction module 210 may be configured to provide these vital statistics to other applications executing on computing device 200. For example, if a user is involved in playing a video game, the video game may be configured to receive a vital statistics from the 3-D interaction module 210 and may adjust the difficulty of the game accordingly. In other embodiments, the vital statistics may be utilized to determine if a user is using the user's hands and/or fingers to interact with the computing device or an inanimate object, such as a stylus. For example, 3-D interaction module 210 may be configured to determine if the object(s) within the 3-D interaction region have a pulse rate, and, if so, then 3-D interaction module 210 may determine that a user's finger(s) and/or hand(s) are in the 3-D interaction region. In such embodiments, the 3-D interaction module 210 may be configured to only attempt to determine gestures when a heart rate is detected. In other embodiments, the 3-D interaction module 210 may be configured to enable other contexts when a heart rate is not detected. For example, the 3-D interaction module 210 may enable additional drawing features when a stylus is detected, or may enable different tools depending upon whether a stylus or finger is detected. For example, in a drawing application a user may utilize the stylus to draw and a finger to erase.

FIG. 3 depicts an illustrative computing environment 300 in which some embodiments of the present disclosure may be practiced. In some embodiments, computing environment 300 may include a computing device 302 configured to create a floating display 304. In some embodiments, floating display 304 may be 3-D, while in others it may be two-dimensional (2-D). Computing device 302 may, in some embodiments, further include camera 306 and one or more light emitting diodes 310 integrated therein. Camera 306 and the one or more light emitting diodes 310 may be incorporated into computing device 302 or may be peripherally connected to computing device 302. As depicted, camera 306 may be positioned with a view angle 308 configured to capture images in the area corresponding with the floating display 304. The one or more light emitting diodes 310 may be configured such that light 312 emitted therefrom may project in a direction that intersects with view angle 308 of camera 306. This intersection may create a 3-D interaction region 314 within which a user may utilize one or more gestures to interact with computing device 300. As depicted herein, 3-D interaction region 314 may coincide with at least a portion of floating display 304 such that a user may interact with one or more items displayed in the floating display 304 through one or more gestures.

In some embodiments, floating display 304 may be a stereoscopic or auto-stereoscopic 3-D display. As used herein, auto-stereoscopic 3-D display refers to any display capable of being perceived by a user as 3-D without the use of additional viewing aids, such as glasses. An auto-stereoscopic display may be achieved through utilization of a display, such as a liquid crystal display (LCD) in conjunction with a parallax barrier or a lenticular array. In some embodiments, computing device 302 may be configured to track the location and or direction of a user's eyes utilizing camera 306 and may be configured to adjust floating display 304 accordingly.

Interacting with a floating display 304 via 3-D interaction region 314 may be beneficial in a number of ways. Because a user would not be touching any surfaces directly to interact with computing device 302, this implementation may reduce drawbacks associated with direct physical contact that may impact a more traditional interactive display. For example, such an implementation may prevent smudging of a physical display of computing device 302. This may reduce the number of times such a physical display would need to be cleaned in addition to improving security because a nefarious user would not be able to discern a previous user's password/pin from smudges on the screen. Such an implementation may reduce or prevent the spread of germs from one user to the next. A user may also be able to wear gloves to interact with computing device 302 which may not be possible with a traditional interactive display. In addition, such an implementation may reduce wear, tear, and/or scratching caused through contact with a user. It will be appreciated that this list of benefits is not exhaustive and is merely meant to be illustrative. Any number of other benefits may be realized through such an implementation.

Figure 4:
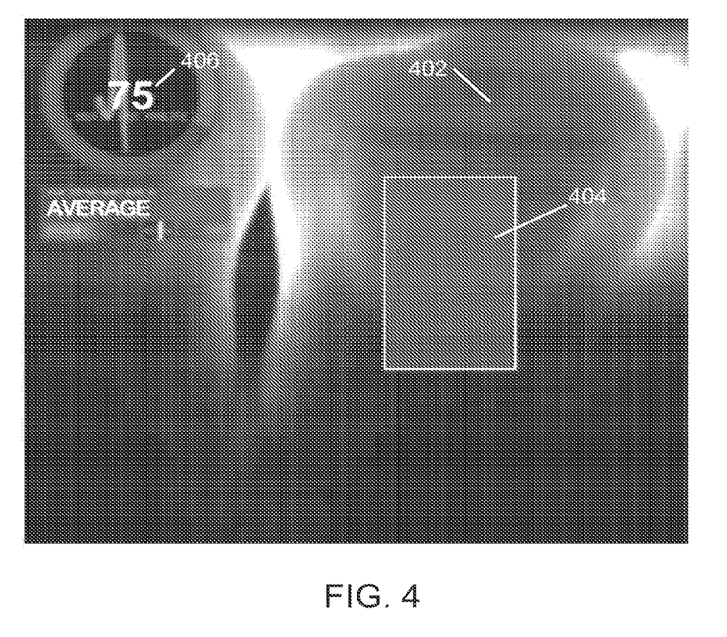
FIG. 4 depicts an illustrative depiction of capturing a heart-rate of a user according to some embodiments of the present disclosure.

FIG. 4 is an illustrative depiction of embodiments configured to capture vital statistics of a user according to some embodiments of the present disclosure. In some embodiments, it may be desirable to detect a user's vital statistics while they are interacting with a computing device. In embodiments, 3-D interaction module may be configured to determine these vital statistics from sensor data. This may be accomplished through photo-plethysmography (PPG). PPG may be used to detect cardio-vascular pulse waves, or heart-beats, traveling through a body of a user utilizing a camera, such as cameras 104 of FIG. 1 and 306 of FIG. 3. The camera may be configured to capture subtle periodic light reflectance or transmittance changes that occur due to blood volume variations during a heart-beat and 3-D interaction module may be configured to detect the subtle periodic light reflectance or transmittance changes. In some embodiments, a user's fingers may be tracked and the subtle periodic light reflectance or transmittance changes that occur within the user's finger may be utilized by the 3-D interaction module to determine a heart rate of the user. For example, as depicted here, finger 402 of the user of the computing device may be tracked for periodic light reflectance or transmittance changes occurring within block 404 to determine a heart rate 406 of the user.

In embodiments, the exact location, intensity and size of the finger may be taken into account when attempting to measure PPG. This added information may allow for non-invasive, in-situ PPG measurements. In some embodiments, the computing device may be further configured to utilize a controlled strobing light source, such as an infra-red (IR) light emitting diode (LED), with a temporally synchronized global shutter camera. The combination of the IR LED and the global shutter camera may increase signal-to-noise ratio and may also act to reduce or prevent interference of computing device display illumination changes and/or ambient lighting changes with the PPG measurement. In some embodiments, the IR LED may be configured to emit light having a wave length of approximately 950 nanometers (nm).

In some embodiments, a user's blood pressure may be able to be determined. In such embodiments, a user may place the user's wrist into a 3-D interaction region, such as that described above. One or more sensors, such as a camera, may be configured to capture images of the veins and the 3-D interaction module may be configured to determine a pulse transit time (PTT) of blood flow through the user's veins. PTT is inversely proportional to blood pressure and may therefore be utilized to determine a user's blood pressure.

In other embodiments, 3-D interaction module may be configured to track the user's vital statistics utilizing LEDs at multiple wavelengths to determine blood oxygenation. For example, one or more sensors may correspond with an IR LED at a 950 nm wavelength, while one or more other sensors may correspond with a red LED at a 650 nm wave length. The 3-D interaction module may be configured to determine a difference in reflectance, transmittance, and/or absorption between the IR and Red wavelengths to determine the blood oxygenation of the user without the need for a traditional finger-clasp oxygenation meter.

Figure 5:
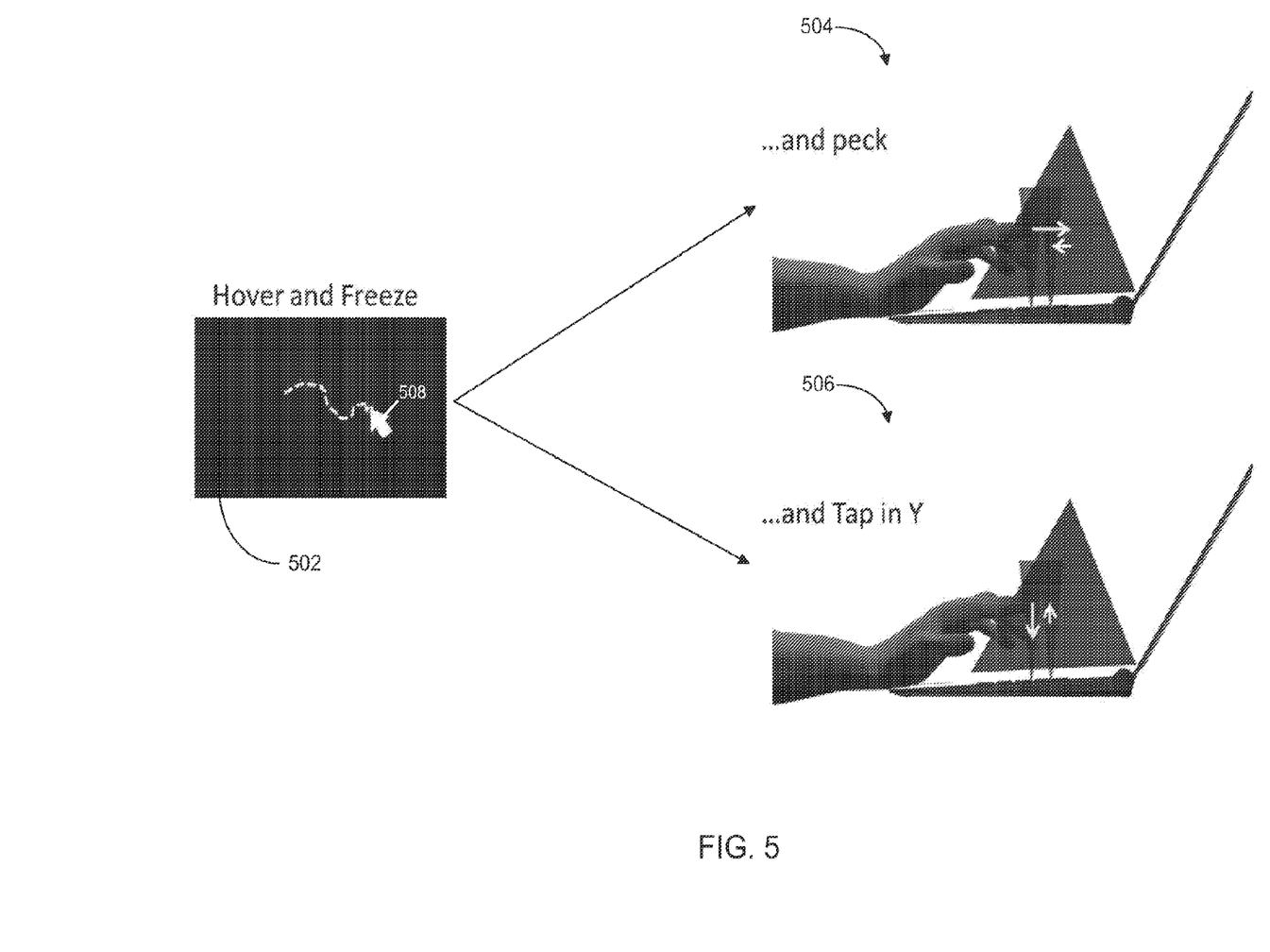
FIG. 5 depicts illustrative gestures according to the present disclosure.

FIG. 5 depicts illustrative gestures according to the present disclosure. As depicted, a user may move the user's finger to a position, within a 3-D interaction region of a computing device, corresponding to a desired location of a cursor 508 on a display 502 of the computing device. Once the user has reached the desired location of the cursor 508, the user may hover, for a pre-determined period of time to cause an action to occur. In some embodiments, hovering for a pre-determined period of time may be sufficient to cause a user control action to occur. In other embodiments it may be necessary for the user to make an additional movement to complete the gesture. For example, after the pre-determined period of time the computing device may be configured to freeze the position of the cursor 508 on the display 502 to prevent accidental movement of the cursor 508. The gesture may then be completed by either pecking 504 in a z-direction of the 3-D interaction region or tapping 506 in a y-direction of the 3-D interaction region. Once the gesture is completed the computing device may be configured to perform one or more user control actions in response to detecting the gesture. For example, the computing device may be configured to execute a mouse click at the location of the cursor upon detecting either pecking 504 or tapping 506. In some embodiments, the pecking 504 may correlate with a right mouse click, while the tapping 506 may correlate with a left mouse click, or vice versa.

Figure 6:
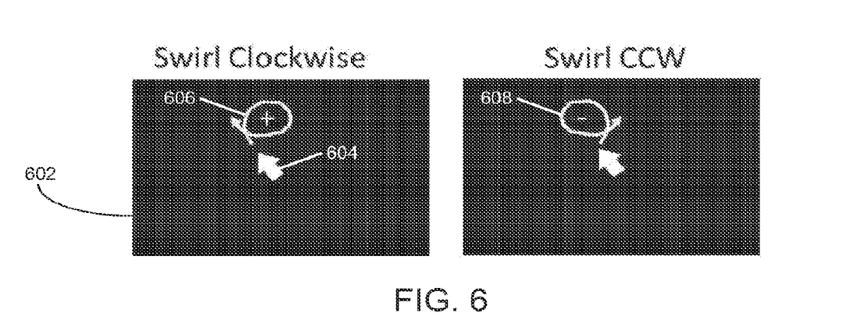
FIG. 6 depicts another illustrative gesture according to the present disclosure.

FIG. 6 depicts another illustrative gesture according to the present disclosure. As depicted, a user may move the user's finger to a position, within a 3-D interaction region of a computing device, corresponding to a desired location of a cursor 604 on a display 602 of the computing device. Once the user has reached the desired location of the cursor 604, according to some embodiments, the user may swirl the user's finger in a clockwise direction 606 around an object on the display to complete the gesture. In other embodiments, the user may swirl the user's finger in a counterclockwise direction 608 around the object to complete the gesture. In response to detecting one or more of these gestures, the computing device may be configured to perform one or more user control actions on the object. For example, the computing device may be configured to perform a right mouse click upon detecting a gesture corresponding to a swirl in clockwise direction 606 and may be configured to perform a left mouse click in response to detecting a gesture corresponding to a swirl in counterclockwise direction 608, or vice versa.

Figure 7:
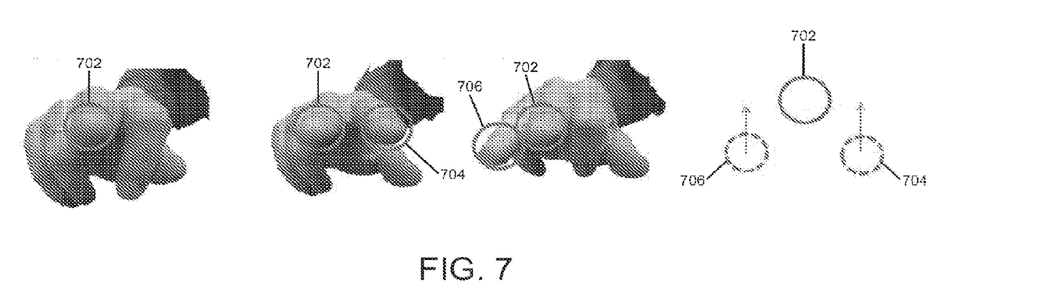
FIG. 7 depicts another illustrative gesture according to the present disclosure.

FIG. 7 depicts another illustrative gesture according to the present disclosure. As depicted, a user may move the user's finger 702 to a position, within a 3-D interaction region of a computing device, corresponding to a desired location of a cursor on a display of the computing device. Once the user has reached the desired location of the cursor, according to some embodiments, the user may raise a finger to the left 704 and/or right 706 of the user's finger to complete the gesture. As depicted here, the fingers 702-706 are directed towards the reader and therefore the direction to the user is indicated as being opposite to that of the reader. In response to detecting one or more of these gestures, the computing device may be configured to perform one or more user control actions on the object. For example, the computing device may be configured to perform a right mouse click in response to detecting the raising of the finger to the right 706 of the user's finger 702 and may be configured to perform a left mouse click in response to detecting the raising of the finger to the left 704 of the user's finger 702, or vice versa.

Figure 8:
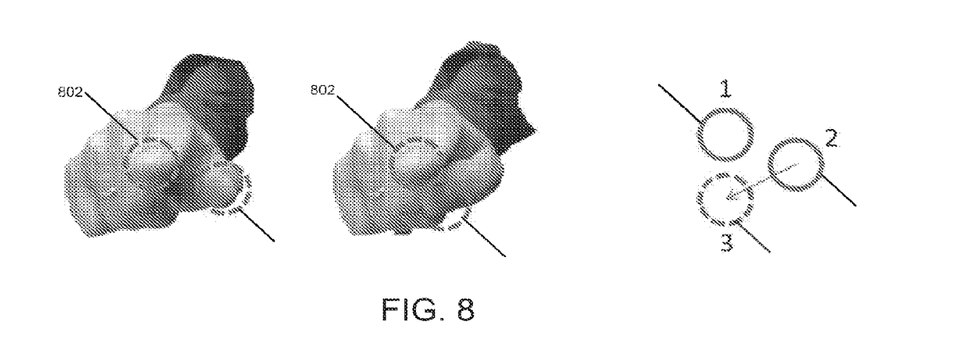
FIG. 8 depicts another illustrative gesture according to the present disclosure.

FIG. 8 depicts another illustrative gesture according to the present disclosure. As depicted, a user may move the user's finger, such as index finger 802, to a position, within a 3-D interaction region of a computing device, corresponding to a desired location of a cursor on a display of the computing device. Once the user has reached the desired location of the cursor, according to some embodiments, the user may bring a finger, such as thumb 804, into contact with finger 802 to complete the gesture. In response to detecting the gesture, the computing device may be configured to perform one or more user control actions on the object. For example, the computing device may be configured to perform a mouse click in response to detecting the completion of the gesture.

Figure 9:
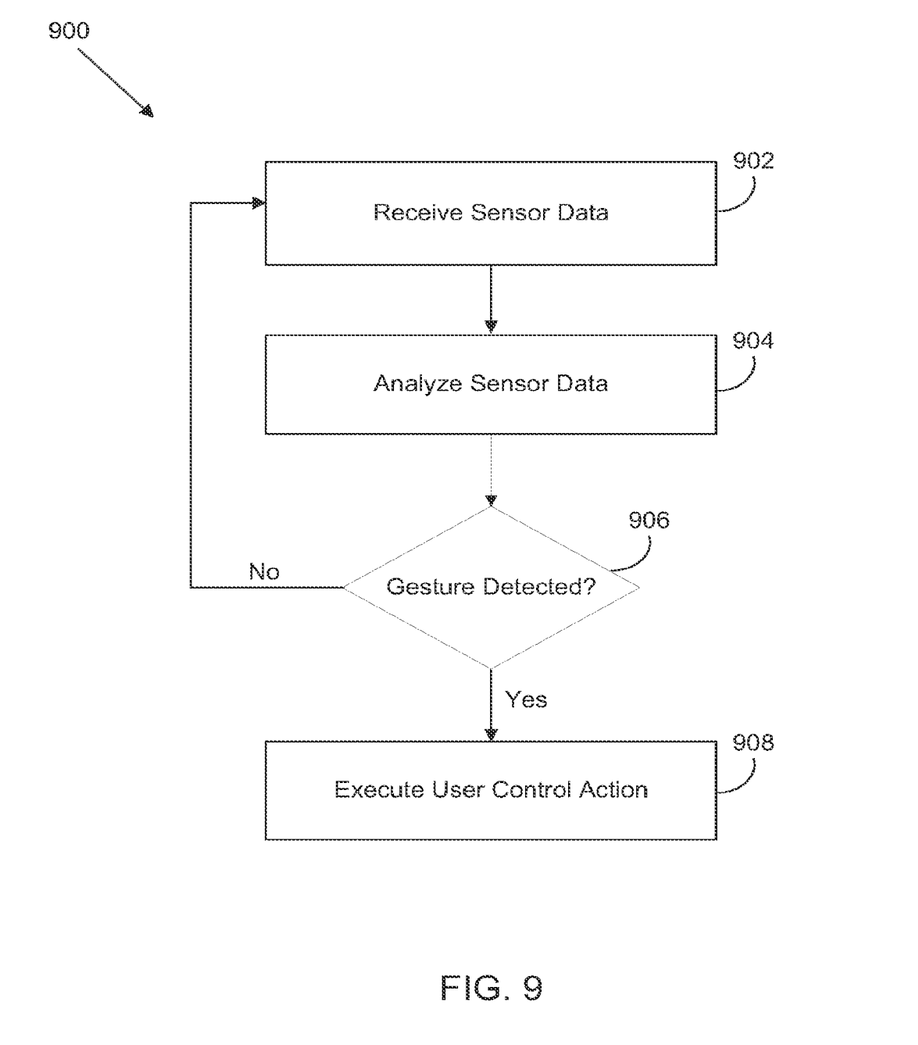
FIG. 9 depicts an illustrative process flow according to some embodiments of the present disclosure.

FIG. 9 depicts an illustrative process flow 900 associated with a 3-D interaction module of a computing device according to some embodiments of the present disclosure. The process may begin at 902 where 3-D interaction module may receive sensor data. The sensor data may be generated by a number of sensors, such as sensors 206 of FIG. 2. In some embodiments, 3-D interaction module may receive the sensor data directly from the number of sensors. In other embodiments, the sensor data may be received via a middleware application, such as an application programming interface (API), which may automatically provide sensor data to 3-D interaction module or may do so upon request by 3-D interaction module.

In embodiments, the sensor data may include coordinates associated with objects being monitored by the sensors. For example, the sensor data may contain coordinate information for fingertips detected within a 3-D interaction region, such as that discussed above in reference to FIGS. 1 and 3. In some embodiments, sensor data may include a number of images captured by a sensor, such as a camera, to be analyzed. The above discussed sensor data is merely meant to be illustrative and is not meant to be limiting of this disclosure. It will be appreciated that any type of sensor data may be utilized without departing from the scope of this disclosure.

In block 904 the sensor data may be analyzed to determine if a user of the computing device has performed a pre-determined gesture. This may be accomplished by analyzing coordinates passed in to 3-D interaction module to determine if a sequence of coordinates matches a pre-determined pattern of coordinates. In some embodiments, where images may be provided to 3-D interaction module, the images may be compared against pre-determined images of gestures to determine whether the image provided by the sensor matches a pre-determined image of a gesture.

As used herein a gesture may include any type of finger and/or hand movement of the user. Illustrative gestures are discussed above in relation to FIGS. 5-8. However, it will be appreciated that the gesture may be any type of gesture and any such gesture is expressly contemplated by this disclosure.

In some embodiments, analyzing the sensor data may include analyzing individual finger movements performed within the 3-D interaction region. In some embodiments, a location within the 3-D interaction region may be determined and this location may be correlated with a corresponding position of a cursor on display of the computing device.

At block 906 a determination is made as to whether or not a gesture has been detected in the sensor data. If a gesture has not been detected then the process proceeds back to block 902. If a gesture has been detected then the process moves to block 908 where a user control action corresponding to the detected gesture may be executed. As used herein, a user control action may be any type of action a user could undertake with input devices of the computing device. Example input devices may include a keyboard, mouse, track ball, touch pad, etc. While discussed in the examples given above in reference to mouse clicks, the user control actions should not be so limited. User control actions may include, for example: scrolling within a window, minimizing, maximizing, or closing a window, zooming in or zooming out on an object rendered on the screen, a right or left mouse click, copying, pasting, etc.

For the purposes of this description, a computer-usable or computer-readable medium can be any medium that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

EXAMPLES

Some non-limiting examples are:

Example 1 is a computing device for human computer interaction comprising: a plurality of sensors, including a plurality of light sources and a camera, to create a three dimensional (3-D) interaction region within which to track individual finger positions of a user of the computing device, wherein the plurality of light sources and the camera are complementarily disposed to enable the camera to capture the individual finger positions in three dimensions; and a 3-D interaction module coupled with the plurality of sensors, the 3-D interaction module to analyze the individual finger positions, in relation to one another, within the 3-D interaction region, captured by the camera, to detect a gesture based on a result of the analysis, and to execute a user control action corresponding to the gesture detected.

Example 2 may include the subject matter of Example 1, further comprising a display coupled with the 3-D interaction module, wherein the 3-D interaction module is to further determine a location of the individual fingers within the 3-D interaction region, and to correlate the location of the individual fingers, within the 3-D interaction region, with a location of a cursor rendered on the display.

Example 3 may include the subject matter of Example 2, wherein the gesture detected comprises holding an individual finger of a hand, extending beyond remaining fingers of the hand, in a fixed location for a pre-determined period of time within the 3-D interaction region, and wherein the 3-D interaction module is to execute a user control action at the correlated location of the cursor rendered on the display.

Example 4 may include the subject matter of Example 2, wherein the gesture detected comprises holding an individual finger of a hand, extending beyond remaining fingers of the hand, in a fixed position within the 3-D interaction region for a first pre-determined period of time to cause the correlated location of the cursor to freeze for a second pre-determined period of time, and the gesture detected further comprises a forward or downward movement of a tip of the individual finger within the second pre-determined period of time, and wherein the 3-D interaction module is to execute a user control action at the correlated location of the cursor rendered on the display.

Example 5 may include the subject matter of Example 2, wherein the gesture detected comprises holding a first finger of the individual fingers in a fixed location within the 3-D interaction region and bringing a second finger of the individual fingers into contact with the first finger, and wherein the 3-D interaction module is to execute a user control action at the correlated location of the cursor rendered on the display.

Example 6 may include the subject matter of Example 2, wherein the gesture detected comprises holding a first finger of the individual fingers in a fixed location, and wherein the gesture detected further comprises bringing a second finger, to the right of the first finger, into contact with the first finger, and wherein the 3-D interaction module is to execute a user control action at the correlated location of the cursor rendered on the display.

Example 7 may include the subject matter of Example 2, wherein the gesture detected comprises holding a first finger of the individual fingers in a fixed location, and wherein the gesture detected further comprises bringing a second finger to the left of the first finger into contact with the first finger, and wherein the 3-D interaction module is to execute a user control action, at the correlated location of the cursor rendered on the display.

Example 8 may include the subject matter of Example 2, wherein the gesture detected comprises swirling an individual finger of a hand, extending beyond remaining fingers of the hand, in a clockwise or counter-clockwise direction, and wherein the 3-D interaction module is to execute a pre-determined user control action, proximate to the correlated location of the cursor rendered on the display, based on the direction of the swirling of the individual finger.

Example 9 may include the subject matter of any one of Examples 1-8, wherein the user control action is one of a left or right mouse click.

Example 10 may include the subject matter of any one of Examples 2-8, wherein the plurality of sensors and the 3-D interaction module are to further cooperate to detect one of heart-rate, blood pressure, or blood oxygenation of the user within the 3-D interaction region.

Example 11 may include the subject matter of any one of Examples 2-8, wherein the plurality of sensors and the 3-D interaction module are to cooperate to detect heart-rate of the user, and the 3-D interaction module is to further perform the analysis, detection of finger movements, and execution only when presence of the heart-rate of the user is detected within the 3-D interaction region.

Example 12 may include the subject matter of any one of Examples 2-8, wherein the display is a floating display projected near or intersecting with the 3-D interaction region and the plurality of light sources are light emitting diodes (LEDs) and wherein to be complementarily disposed further comprises disposition of the LEDs such that light from the LEDs intersects a viewing angle of the camera where the intersection between the light and the viewing angle creates the 3-D interaction region.

Example 13 is a computer-implemented method for human computer interaction comprising: analyzing, by a three dimensional (3-D) interaction module of a computing device, sensor data associated with individual finger positions of a user of the computing device, within a 3-D interaction region, sensed by a plurality of sensors of the computing device that include a plurality of light sources and a camera, wherein the plurality of light sources and the camera are complementarily disposed for the camera to capture the individual finger positions in three dimensions; detecting, by the 3-D interaction module, a gesture of the user, based at least in part on a result of the analysis; and executing, by the 3-D interaction module, a user control action corresponding to the gesture detected, to control the computing device.

Example 14 may include the subject matter of Example 13, further comprising analyzing the individual finger movements to detect a mouse click gesture based on the individual finger movements and executing a mouse click in response to detection of the mouse-click gesture.

Example 15 may include the subject matter of Example 13, further comprising: determining a location of the individual fingers within the 3-D interaction region, and correlating the location of the individual fingers, within the 3-D interaction region, with a location of a cursor rendered on a display of the computing device.

Example 16 may include the subject matter of Example 15, wherein the gesture detected comprises holding an individual finger of a hand, extending beyond remaining fingers of the hand, in a fixed location for a pre-determined period of time within the 3-D interaction region.

Example 17 may include the subject matter of Example 15, wherein the gesture detected comprises holding an individual finger of a hand, extending beyond remaining fingers of the hand, in a fixed position within the 3-D interaction region for a first pre-determined period of time to cause the correlated location of the cursor to freeze for a second pre-determined period of time, and the gesture detected further comprises a forward or downward movement of a tip of the individual finger within the second pre-determined period of time and wherein executing further comprises executing a user control action proximate to the correlated location of the cursor rendered on the display.

Example 18 may include the subject matter of Example 15, wherein the gesture detected comprises holding a first finger of the individual fingers in a fixed location within the 3-D interaction region and bringing a second finger of the individual fingers into contact with the first finger, and wherein executing further comprises executing a user control action proximate to the correlated location of the cursor rendered on the display.

Example 19 may include the subject matter of Example 15, wherein the gesture detected comprises holding a first finger of the individual fingers in a fixed location, and wherein the gesture detected further comprises bringing a second finger, to the right of the first finger, into contact with the first finger, and wherein executing further comprises executing a user control action proximate to the correlated location of the cursor rendered on the display.

Example 20 may include the subject matter of Example 15, wherein the gesture detected comprises holding a first finger of the individual fingers in a fixed location, and wherein the gesture detected further comprises bringing a second finger to the left of the first finger into contact with the first finger, and wherein executing further comprises executing a user control action proximate to the correlated location of the cursor rendered on the display.

Example 21 may include the subject matter of Example 15, wherein the gesture detected comprises swirling an individual finger of a hand, extending beyond remaining fingers of the hand, in a clockwise or counter-clockwise direction, and wherein executing further comprises executing a user control action proximate to the correlated location of the cursor rendered on the display, the user control action based on the direction of the swirling of the individual finger.

Example 22 may include the subject matter of any one of Examples 13-21, wherein the user control action is a mouse click of an item proximate to the correlated location of the cursor rendered on the display.

Example 23 may include the subject matter of any one of Examples 13-21, wherein the 3-D interaction region coincides or intersects with a floating display.

Example 24 is one or more computer-readable media having instructions stored thereon which, when executed by a computing device, cause the computing device to perform the method of any one of Examples 13-23.

Example 25 is a computing apparatus for human computer interaction comprising: means for performing the method of any one of Examples 13-23.

Example 26 is a computing device for human computer interaction comprising: means for analyzing, by a three dimensional (3-D) interaction module of a computing device, sensor data associated with individual finger positions of a user of the computing device, within a 3-D interaction region, sensed by a plurality of sensors of the computing device that include a plurality of light sources and a camera, wherein the plurality of light sources and the camera are complementarily disposed for the camera to capture the individual finger positions in three dimensions; means for detecting, by the 3-D interaction module, a gesture of the user, based at least in part on a result of the analysis; and means for executing, by the 3-D interaction module, a user control action corresponding to the gesture detected, to control the computing device.

Example 27 may include the subject matter of Example 26, further comprising means for analyzing the individual finger movements to detect a mouse click gesture based on the individual finger movements and means for executing a mouse click in response to detection of the mouse-click gesture.

Example 28 may include the subject matter of Example 26, further comprising: means for determining a location of the individual fingers within the 3-D interaction region, and means for correlating the location of the individual fingers, within the 3-D interaction region, with a location of a cursor rendered on a display of the computing device.

Example 29 may include the subject matter of Example 28, wherein the gesture detected comprises holding an individual finger of a hand, extending beyond remaining fingers of the hand, in a fixed location for a pre-determined period of time within the 3-D interaction region.

Example 30 may include the subject matter of Example 28, wherein the gesture detected comprises holding an individual finger of a hand, extending beyond remaining fingers of the hand, in a fixed position within the 3-D interaction region for a first pre-determined period of time to cause the correlated location of the cursor to freeze for a second pre-determined period of time, and the gesture detected further comprises a forward or downward movement of a tip of the individual finger within the second pre-determined period of time and wherein executing further comprises executing a user control action proximate to the correlated location of the cursor rendered on the display.

Example 31 may include the subject matter of Example 28, wherein the gesture detected comprises holding a first finger of the individual fingers in a fixed location within the 3-D interaction region and bringing a second finger of the individual fingers into contact with the first finger, and wherein executing further comprises executing a user control action proximate to the correlated location of the cursor rendered on the display.

Example 32 may include the subject matter of Example 28, wherein the gesture detected comprises holding a first finger of the individual fingers in a fixed location, and wherein the gesture detected further comprises bringing a second finger, to the right of the first finger, into contact with the first finger, and wherein executing further comprises executing a user control action proximate to the correlated location of the cursor rendered on the display.

Example 33 may include the subject matter of Example 28, wherein the gesture detected comprises holding a first finger of the individual fingers in a fixed location, and wherein the gesture detected further comprises bringing a second finger to the left of the first finger into contact with the first finger, and wherein executing further comprises executing a user control action proximate to the correlated location of the cursor rendered on the display.

Example 34 may include the subject matter of Example 28, wherein the gesture detected comprises swirling an individual finger of a hand, extending beyond remaining fingers of the hand, in a clockwise or counter-clockwise direction, and wherein executing further comprises executing a user control action proximate to the correlated location of the cursor rendered on the display, the user control action based on the direction of the swirling of the individual finger.

Example 35 may include the subject matter of any one of Examples 26-34, wherein the user control action is a mouse click of an item proximate to the correlated location of the cursor rendered on the display.

Example 36 may include the subject matter of any one of Examples 26-34, wherein the 3-D interaction region coincides or intersects with a floating display.

What is claimed is:

1. One or more non-transitory computer-readable media having instructions stored thereon that, when executed by a computing device, provide the computing device with a three-dimensional (3-D) interaction module configured to:
   analyze sensor data associated with individual finger positions of a user of the computing device, only within a 3-D interaction region, sensed by a plurality of sensors of the computing device that include a plurality of light sources and a camera, wherein the plurality of light sources and the camera are complementarily disposed for the camera to capture the individual finger positions in three dimensions, and wherein the 3-D interaction region is a region in which light emitted from the plurality of light sources intersects a viewing angle of the camera and within a viewing area of a display such that the individual finger positions within the viewing angle of the camera and outside of the 3-D interaction region are not to be included as a gesture of the user;
   detect a gesture of the user, based at least in part on a result of the analysis,
   wherein the gesture comprises at least a first individual finger of a hand hovering in a same position for a predetermined period of time and at least one movement using the first individual finger, using a second individual finger of the hand, or using the first individual finger and the second individual finger;
   determine a location of the first individual finger or the second individual finger within the 3-D interaction region;
   correlate the location of the first individual finger or the second individual finger, within the 3-D interaction region, with a location of a cursor rendered on a display of the computing device,
   wherein the at least one movement comprises holding the first individual finger of the hand, extending beyond remaining fingers of the hand, in a fixed position within the 3-D interaction region for a first predetermined period of time to cause the correlated location of the cursor to freeze for a second predetermined period of time, and the at least one movement further comprises a forward or downward movement of a tip of the first individual finger within the second predetermined period of time; and
   execute a user control action corresponding to the detected gesture, to control the computing device, and wherein to execute further comprises execution of a user control action proximate to the correlated location of the cursor rendered on the display.

2. The one or more non-transitory computer-readable media of claim 1, wherein the 3-D interaction module is further configured to analyze the at least one movements to detect a mouse click gesture based on the at least one movements and execute a mouse click in response to detection of the mouse-click gesture.

3. The one or more non-transitory computer-readable media of claim 1, wherein the at least one movement comprises holding the first individual finger of the hand, extending beyond the remaining fingers of the hand, in a fixed location for the predetermined period of time within the 3-D interaction region.

4. The one or more non-transitory computer-readable media of claim 1, wherein the at least one movement comprises holding the first individual finger of the individual fingers in a fixed location within the 3-D interaction region and bringing the second finger of the individual fingers into contact with the first individual finger, and wherein to execute further comprises execution of a user control action proximate to the correlated location of the cursor rendered on the display.

5. The one or more non-transitory computer-readable media of claim 1, wherein the at least one movement comprises holding the first individual finger of the individual fingers in a fixed location, and wherein the at least one movement further comprises bringing the second individual finger, to a right of the first individual finger, into contact with the first individual finger, and wherein to execute further comprises execution of a user control action proximate to the correlated location of the cursor rendered on the display.

6. The one or more non-transitory computer-readable media of claim 1, wherein the at least one movement comprises holding the first individual finger of the individual fingers in a fixed location, and wherein the at least one movement further comprises bringing the second finger to a left of the first individual finger into contact with the first individual finger, and wherein to execute further comprises execution of a user control action proximate to the correlated location of the cursor rendered on the display.

7. The one or more non-transitory computer-readable media of claim 1, wherein the at least one movement comprises swirling the first individual finger of the hand, extending beyond the remaining fingers of the hand, in a clockwise or counter-clockwise direction, and wherein to execute further comprises execution of a user control action proximate to the correlated location of the cursor rendered on the display, the user control action based on the direction of the swirling of the individual finger.

8. The one or more non-transitory computer-readable media of claim 1, wherein the user control action is a mouse click of an item proximate to the correlated location of the cursor rendered on the display.

9. The one or more non-transitory computer-readable media of claim 1, wherein the 3-D interaction region coincides or intersects with a floating display.

10. A computing device for human computer interaction comprising:
   a plurality of sensors, including a plurality of light sources and a camera, to create a three-dimensional (3-D) interaction region in which light emitted from the plurality of light sources intersects a viewing angle of the camera and is within a viewing area of a display, within which to track individual finger positions of a user of the computing device, wherein the plurality of light sources and the camera are complementarily disposed to enable the camera to capture the individual finger positions in three dimensions;

a 3-D interaction module coupled with the plurality of sensors, the 3-D interaction module to analyze the individual finger positions, in relation to one another, only within the 3-D interaction region such that the individual finger positions within the viewing angle of the camera and outside of the 3-D interaction region are not to be included as a gesture of the user, captured by the camera, to detect a gesture based on a result of the analysis, and to execute a user control action corresponding to the gesture detected; and a display coupled with the 3-D interaction module, wherein the 3-D interaction module is to further determine a location of the individual fingers within the 3-D interaction region, and to correlate the location of the individual fingers, within the 3-D interaction region, with a location of a cursor rendered on the display, wherein the detected gesture comprises an individual finger of the individual fingers to be extended beyond remaining fingers of the individual fingers in a fixed position within the 3-D interaction region for a first predetermined period of time to cause the correlated location of the cursor to freeze for a second predetermined period of time, and the gesture detected further comprises a forward or downward movement of a tip of the individual finger within the second predetermined period of time, and wherein the 3-D interaction module is to execute a user control action at the correlated location of the cursor rendered on the display.

11. The computing device of claim 10, wherein the gesture detected comprises holding the individual finger, extending beyond the remaining fingers of the individual fingers, in a fixed location for the first predetermined period of time within the 3-D interaction region, and wherein the 3-D interaction module is to execute a user control action at the correlated location of the cursor rendered on the display.

12. The computing device of claim 10, wherein the individual finger is a first individual finger of the individual fingers and the gesture detected comprises holding the first individual finger in a fixed location within the 3-D interaction region and bringing a second finger of the individual fingers into contact with the first individual finger, and wherein the 3-D interaction module is to execute a user control action at the correlated location of the cursor rendered on the display.

13. The computing device of claim 10, wherein the individual finger is a first individual finger of the individual fingers and the gesture detected comprises holding the first individual finger of the individual fingers in a fixed location, and wherein the gesture detected further comprises bringing a second individual finger of the individual fingers, to the right of the first individual finger, into contact with the first individual finger, and wherein the 3-D interaction module is to execute a user control action at the correlated location of the cursor rendered on the display.

14. The computing device of claim 10, wherein the individual finger is a first individual finger of the individual fingers and the gesture detected comprises holding the first individual finger of the individual fingers in a fixed location, and wherein the gesture detected further comprises bringing a second individual finger to a left of the first individual finger into contact with the first individual finger, and wherein the 3-D interaction module is to execute a user control action, at the correlated location of the cursor rendered on the display.

15. The computing device of claim 10, wherein the gesture detected comprises swirling the individual finger, extending beyond the remaining fingers of a hand, in a clockwise or counter-clockwise direction, and wherein the 3-D interaction module is to execute a predetermined user control action, proximate to the correlated location of the cursor rendered on the display, based on the direction of the swirling of the individual finger.

16. The computing device of claim 10, wherein the display is a floating display projected near or intersecting with the 3-D interaction region and the plurality of light sources are light emitting diodes (LEDs) and wherein to be complementarily disposed further comprises disposition of the LEDs such that light from the LEDs intersects the viewing angle of the camera where the intersection between the light and the viewing angle defines the 3-D interaction region.

17. The computing device of claim 10, wherein the user control action is one of a left or right mouse click.

18. The computing device of claim 10, wherein at least the camera of the plurality of sensors and the 3-D interaction module are to further cooperate to detect one of heart rate, blood pressure, or blood oxygenation of the user within the 3-D interaction region.

19. The computing device of claim 10, wherein the plurality of sensors and the 3-D interaction module are to cooperate to detect a heart rate of the user, and the 3-D interaction module is to further perform the analysis, detection of finger movements, and execution only when presence of the heart rate of the user is detected within the 3-D interaction region.

20. A computer-implemented method for human computer interaction comprising:

analyzing, by a three-dimensional (3-D) interaction module of a computing device, sensor data associated with individual finger positions of a user of the computing device, only within a 3-D interaction region, sensed by a plurality of sensors of the computing device that include a plurality of light sources and a camera, wherein the plurality of light sources and the camera are complementarily disposed for the camera to capture the individual finger positions in three dimensions, and wherein the 3-D interaction region is a region in which light emitted from the plurality of light sources intersects a viewing angle of the camera and is within a viewing area of a display such that the individual finger positions within the viewing angle of the camera and outside of the 3-D interaction region are not to be included as a gesture of the user;

detecting, by the 3-D interaction module, a gesture of the user, based at least in part on a result of the analysis, wherein the gesture comprises at least an individual finger of a hand hovering in a same position for a predetermined period of time and at least one of a pecking motion in a z-direction of the 3-D interaction region or a tapping motion in a y-direction of the 3-D interaction region; and executing, by the 3-D interaction module, a user control action corresponding to the gesture detected, to control the computing device.

21. The computer-implemented method of claim 20, further comprising analyzing the individual finger movements to detect a mouse click gesture based on the individual finger movements and executing a mouse click in response to detection of the mouse-click gesture.

\* \* \* \* \*